(12) United States Patent
Cheung

(10) Patent No.: US 9,267,325 B2
(45) Date of Patent: Feb. 23, 2016

(54) AIRPLANE SHADE HANDLE AND SLIDING MECHANISM

(71) Applicant: The Boeing Company, Chicago, IL (US)

(72) Inventor: Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 14/157,013

(22) Filed: Jan. 16, 2014

(65) Prior Publication Data
US 2015/0089771 A1 Apr. 2, 2015

Related U.S. Application Data

(60) Provisional application No. 61/885,646, filed on Oct. 2, 2013.

(51) Int. Cl.
| | | |
|---|---|---|
| *E06B 9/58* | (2006.01) | |
| *E06B 9/38* | (2006.01) | |
| *B25G 1/00* | (2006.01) | |
| *E06B 9/42* | (2006.01) | |
| *E06B 9/78* | (2006.01) | |
| *B64C 1/14* | (2006.01) | |

(52) U.S. Cl.
CPC ... *E06B 9/38* (2013.01); *B25G 1/00* (2013.01); *B64C 1/1484* (2013.01); *E06B 9/42* (2013.01); *E06B 9/58* (2013.01); *E06B 9/581* (2013.01); *E06B 9/78* (2013.01); *Y10T 16/44* (2015.01); *Y10T 16/476* (2015.01)

(58) Field of Classification Search
CPC ............ E06B 9/58; E06B 9/78; E06B 9/581; E06B 9/38; E06B 9/42; B25G 1/00; Y10T 16/44; Y10T 16/476; B64C 1/1484
USPC ............... 160/90, 274, 289, 267.1, 270, 271, 160/DIG. 15, 380, 392, 395, 298, 299
See application file for complete search history.

(56) References Cited

U.S. PATENT DOCUMENTS

| | | | | | |
|---|---|---|---|---|---|
| 643,629 | A | * | 2/1900 | Burrowes | ....................... 160/274 |
| 849,167 | A | * | 4/1907 | Skov | ............................. 160/289 |
| 2,383,015 | A | * | 8/1945 | Pratt | .......................... 160/267.1 |

(Continued)

OTHER PUBLICATIONS

MechoSystems "Specialy Shades" accessed via the internet on May 28, 2013, at URL http://www.mechoshade.com/specialtyshades/optionalskylighteracc.cfm 3 pages.

(Continued)

*Primary Examiner* — Blair M Johnson
(74) *Attorney, Agent, or Firm* — Baker & Hostetler LLP

(57) ABSTRACT

A window shade handle system includes a handle section and a post configured on each end of the handle section. Each post has four sides that are restrained by a post channel in a track section. The post channel restrains each side of the post. The handle section is constructed of a front handle section affixed to a rear handle section. The front handle section and the rear handle section form a channel that accommodates a window shade wrapped about a rod. The channel may have a raised portion that physically contacts the window shade while the handle sections otherwise allow the shade to expand and contract.

18 Claims, 9 Drawing Sheets

(56) References Cited

U.S. PATENT DOCUMENTS

| | | | | |
|---|---|---|---|---|
| 3,797,553 | A * | 3/1974 | Elliott | 160/267.1 |
| 5,113,922 | A | 5/1992 | Christensen et al. | |
| 5,535,806 | A | 7/1996 | Kold et al. | |
| 6,227,491 | B1 | 5/2001 | Stephan et al. | |
| 6,945,305 | B1 * | 9/2005 | Limauro | 160/369 |
| 8,371,355 | B2 | 2/2013 | Santoro et al. | |
| 2007/0125504 | A1 | 6/2007 | Early et al. | |
| 2009/0205166 | A1 * | 8/2009 | Murray | 16/221 |
| 2010/0326607 | A1 | 12/2010 | Kitani et al. | |

OTHER PUBLICATIONS

Comfortrack Cellular Shades by Comfortex, accessed via the internet on May 28, 2013, at URL http://www.shadesshuttersblinds.com/Side_Track_Cells 4 pages.

Canada Patent Application No. 2,858,101; Office Action; dated Jul. 16, 2015; 4 pages.

European Patent Application No. 14187426.3; Extended European Search Report; dated Mar. 5, 2015; 5 pages.

* cited by examiner

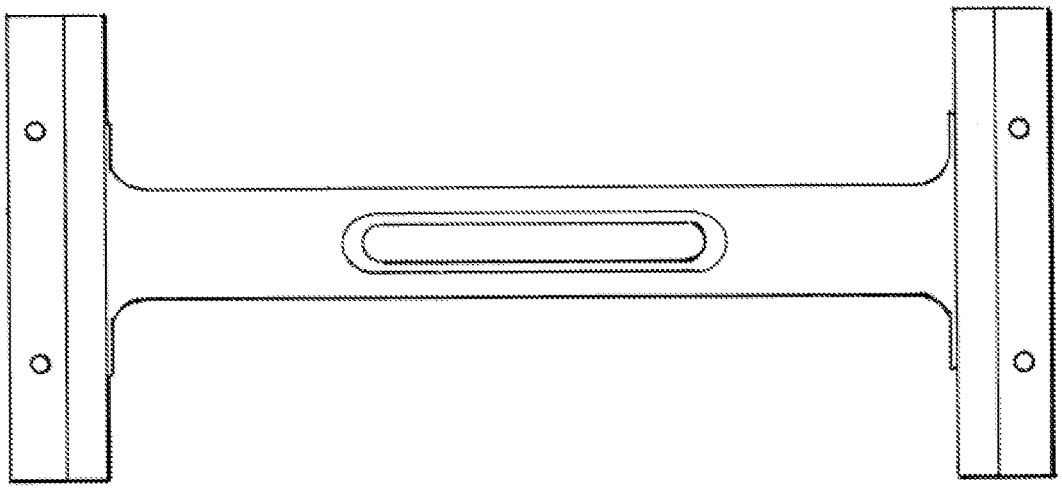
Fig_1A
(PRIOR ART)
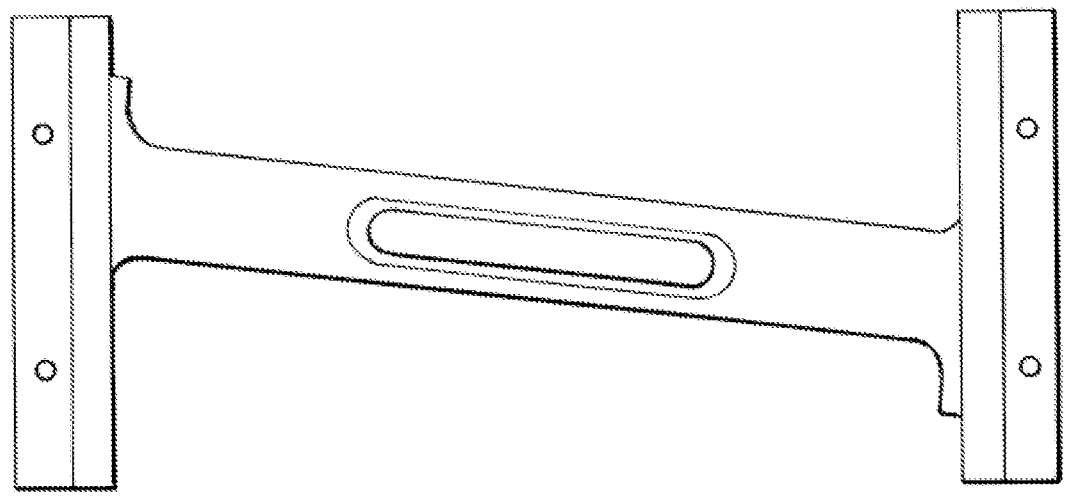
Fig_1B
(PRIOR ART)

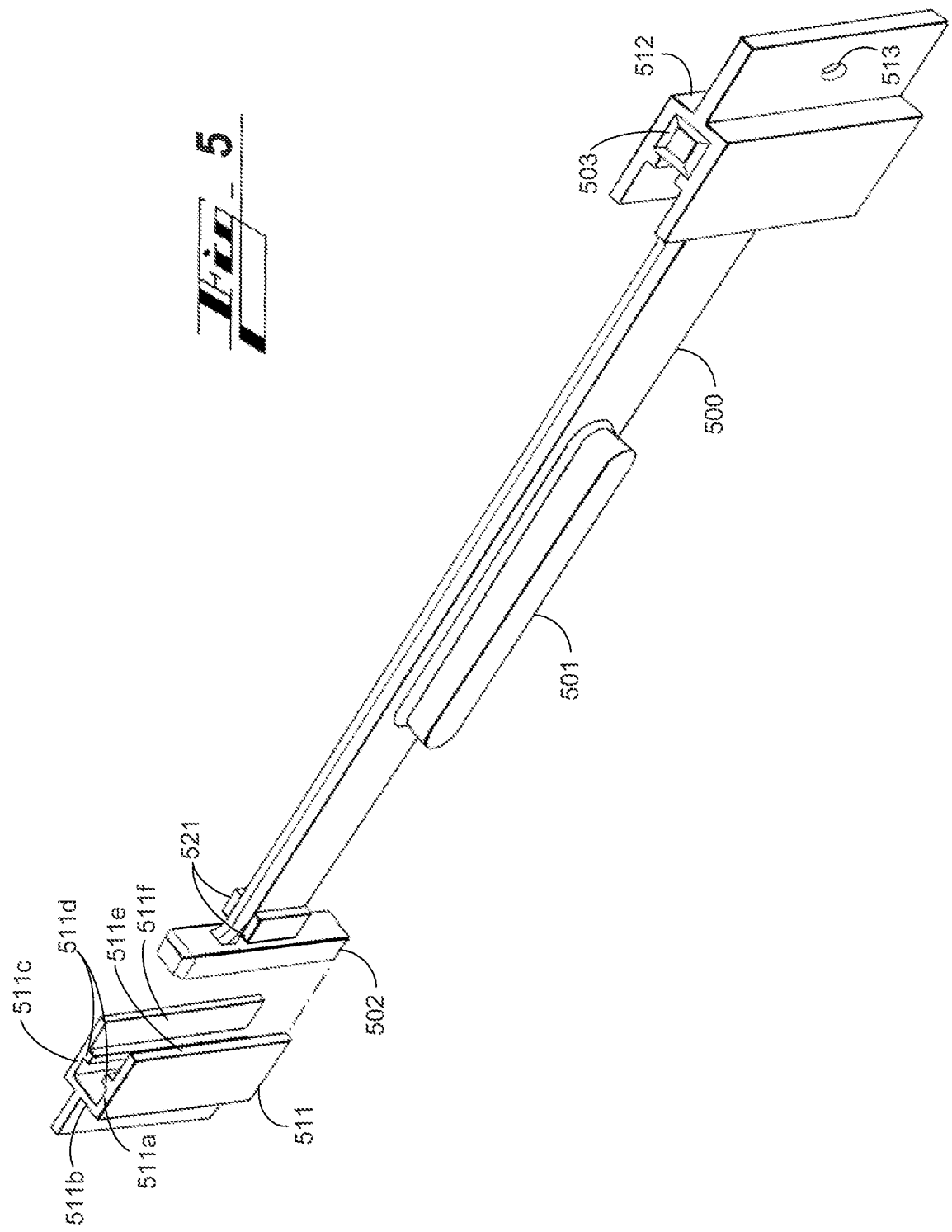

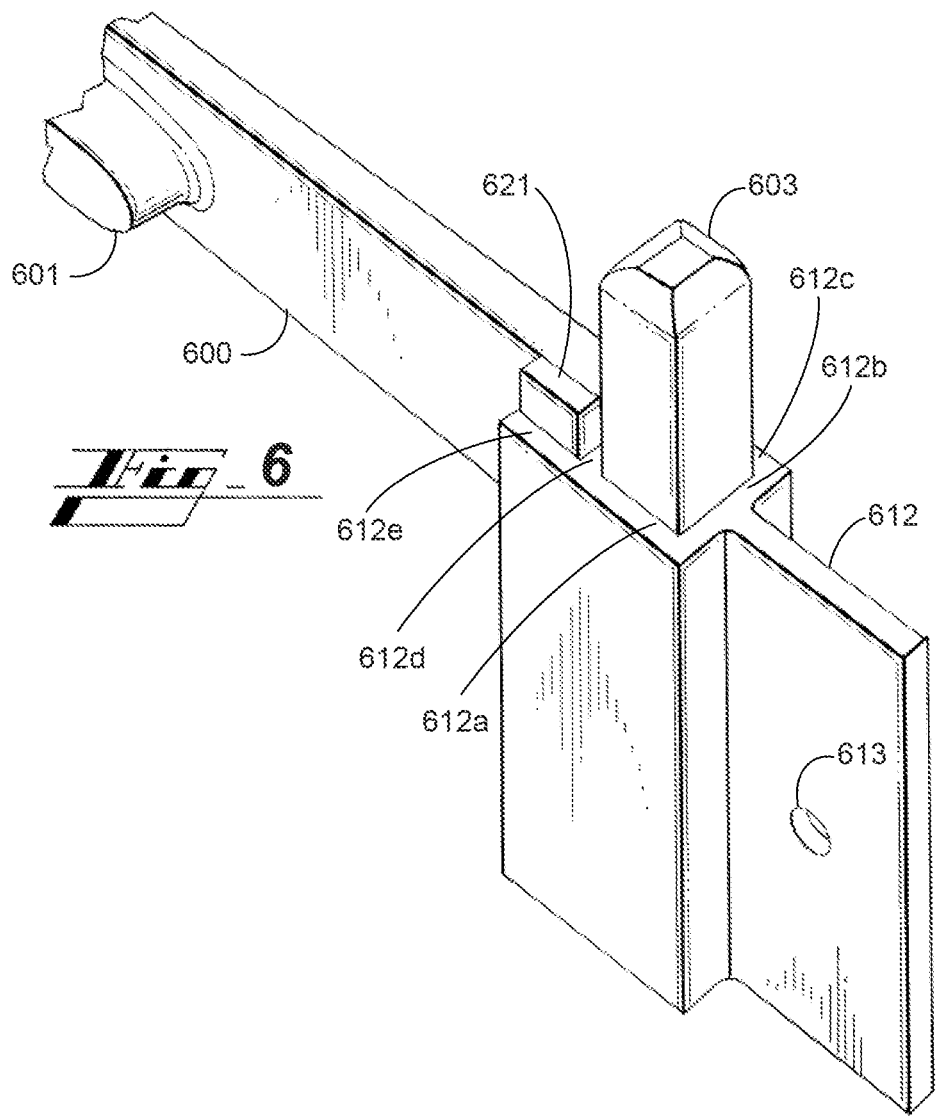

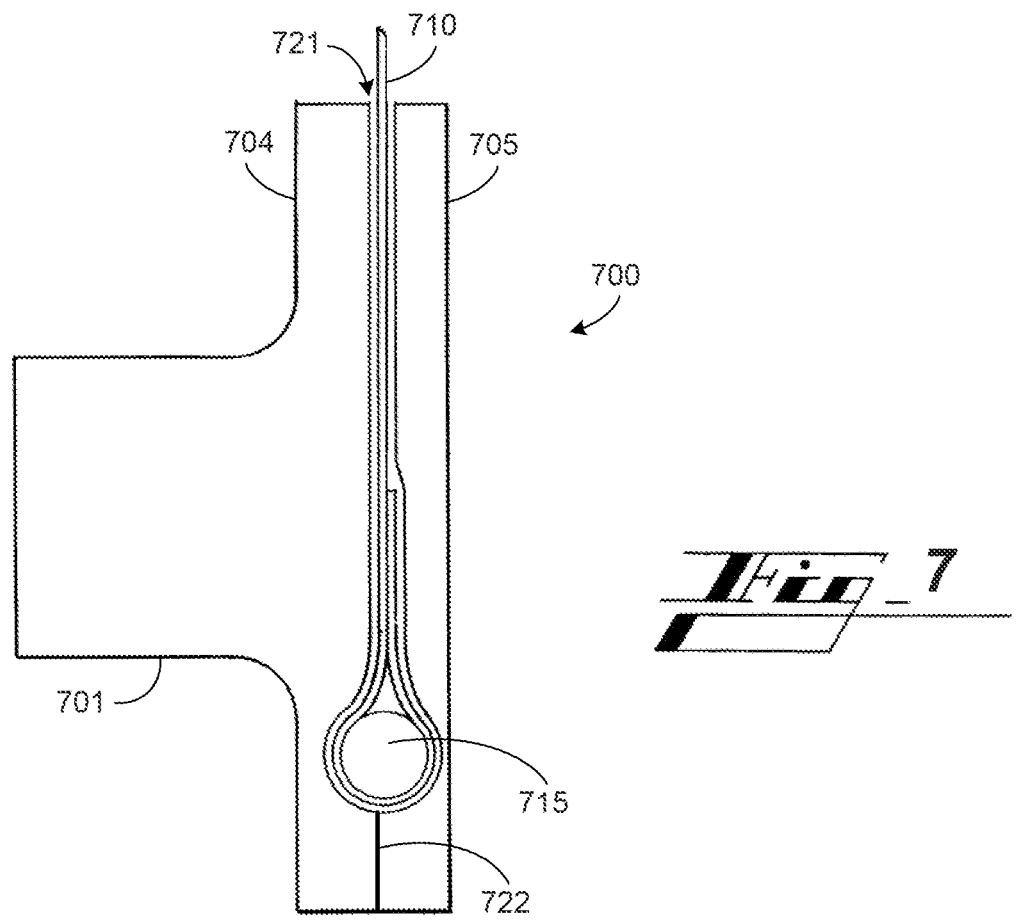
Fig_7
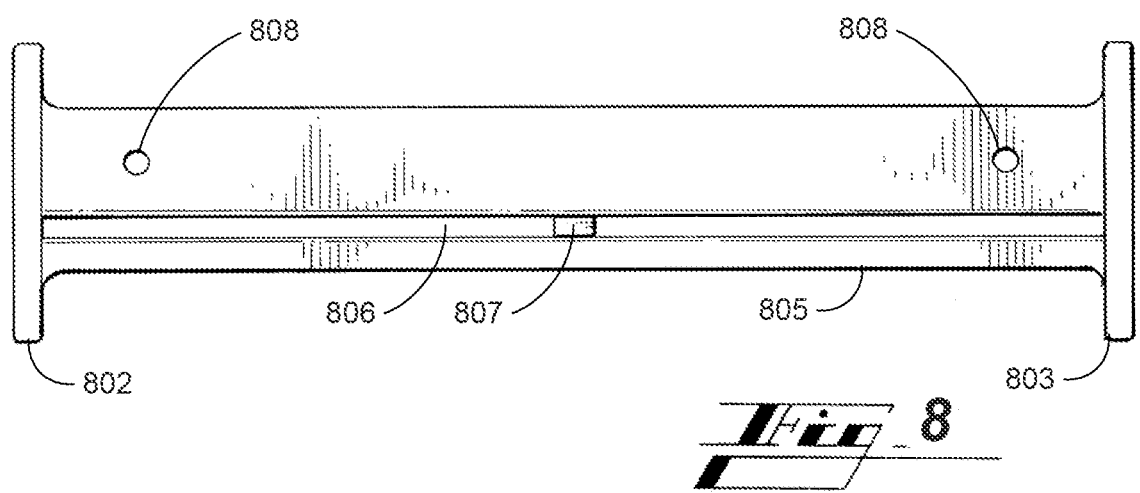
Fig_8

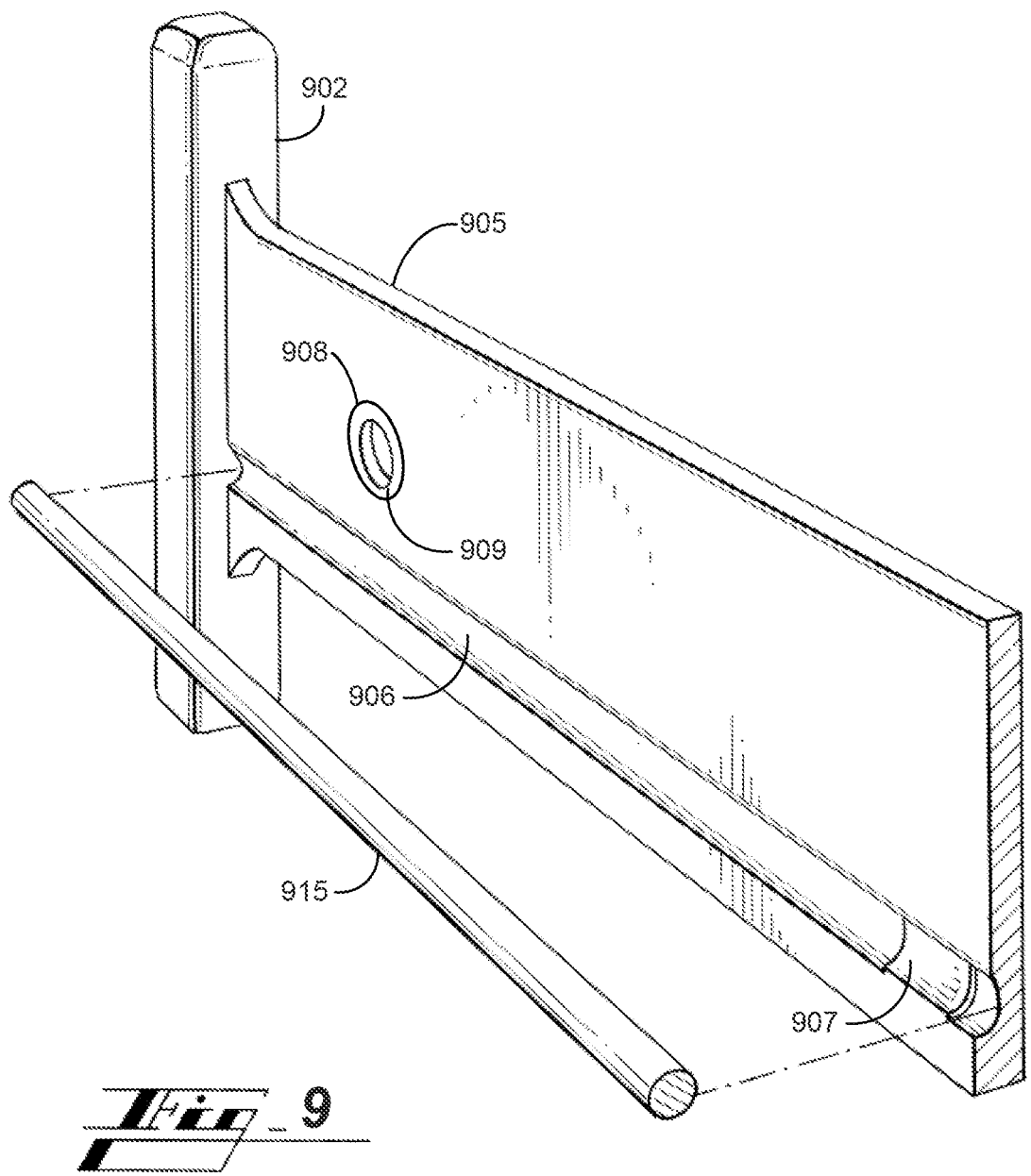

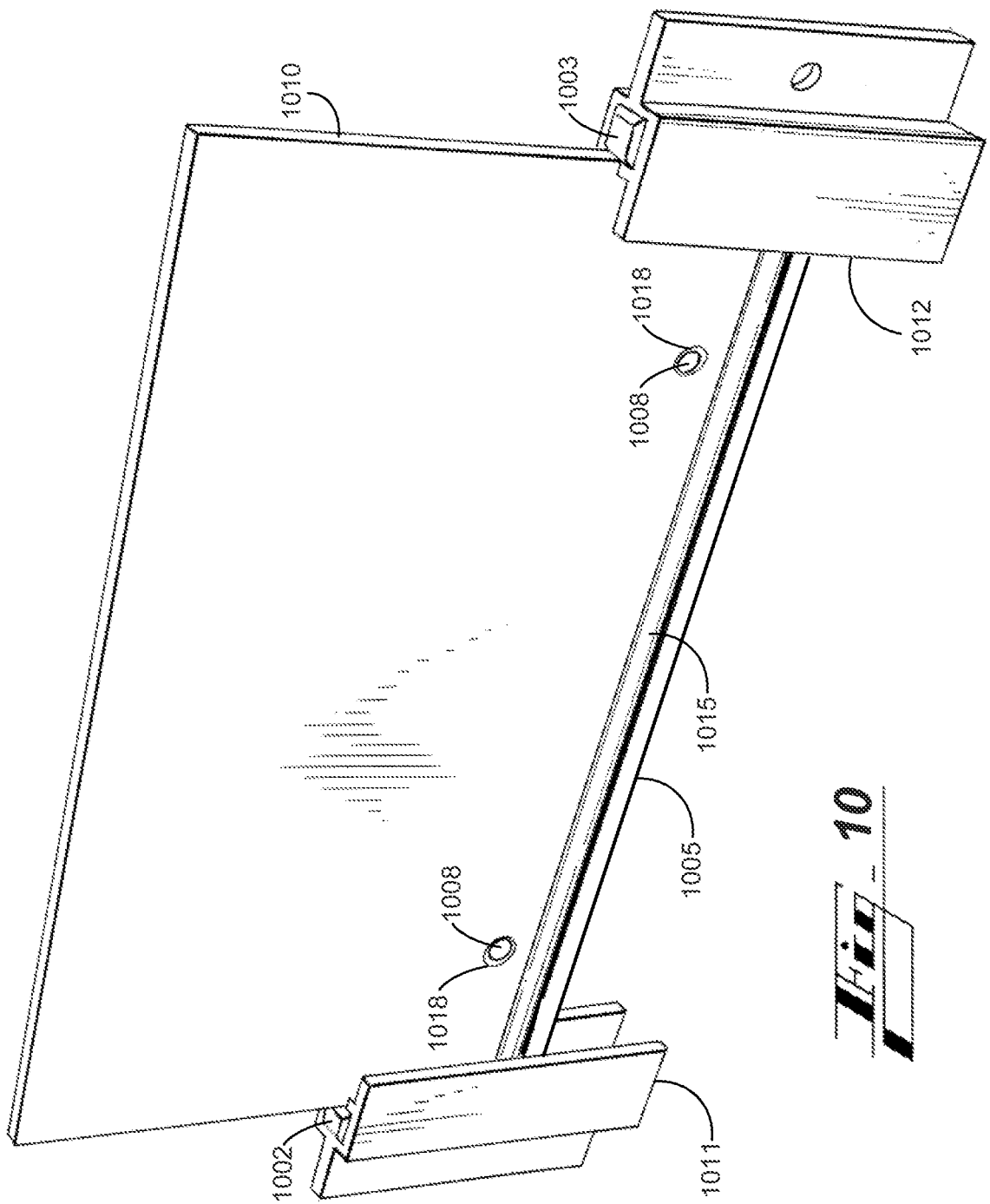

AIRPLANE SHADE HANDLE AND SLIDING MECHANISM

CROSS REFERENCE TO RELATED APPLICATIONS

This application claims priority to U.S. Provisional Patent Application Ser. No. 61/885,646, filed on Oct. 2, 2013, which is incorporated herein by reference in its entirety.

TECHNICAL FIELD

The technical field generally relates to airplane window shades and more specifically relates to airplane window shade handle systems.

BACKGROUND

Most windows in airplane cabins are configured with window shades constructed of a single solid, thin panel. Shades configured in escape hatch doors often use window shades that are flexible and affixed with rollers about which the flexible window shade rolls up because such hatches have too little space to allow a solid shade to function. Where there is space available, solid shades have proven to provide better performance and longevity than roller shades, primarily due to their simplicity as solid shades do not require roller mechanisms and related devices. Although solid shades use shade tracks on both sides of the shade that are similar to shade tracks used in roller shade systems, a solid shade and its handle are molded together into a single solid body structure. When a solid shade is traveling (i.e., sliding up or down) in the tracks, the left and right edges of the handle of the solid shade and the left and right edges of the shade itself function as a shade guide, attempting to maintain a perpendicular geometry with tracks. In a roller shade system, the shade itself is a flexible material (e.g., cloth) with the handle being solid and performing the shade guide function. In such systems, the shade handle is responsible for maintaining perpendicularity to the left and right shade tracks, as shown in FIG. 1A.

In solid shade systems, but not usually in roller shade systems, a handle and shade may help maintain the shade in a perpendicular position relative to the shade tracks as the shade itself also functions as a shade guide. When the handle is not perpendicular to the tracks or the ends of the handle are otherwise are out of alignment with each other, the handle may twist as shown in FIG. 1B. This twisting may result in the handle becoming stuck or inhibited from travel within the tracks, thereby preventing easy operation of the shade. Handle twisting may also cause shade damage, such as wrinkling in the shade as shown in FIG. 2. This wrinkling may be aesthetically unpleasant for passengers. Handle twisting may further lead to more severe damage, such as a shade and handle escaping their intended geometry as shown in FIG. 3.

Wrinkling of a shade can also occur due to changes in temperature and moisture at the shade. The exterior of an aircraft, and components inside an aircraft but proximate to the exterior, such as a shade, can experience extreme temperature and moisture variations and ultraviolet light exposure during normal operation of the aircraft. The material from which shades are constructed expands and contracts due to these temperature and moisture variations, which can result in wrinkling as shown in FIG. 4.

In any of these situations, even if the wrinkles in a shade are straightened out periodically, after a period of time wrinkles introduced into a shade will eventually fatigue and cause the material to permanently show the wrinkles (i.e., "shade memory"), giving the shade an unacceptable appearance and potentially causing other damage.

SUMMARY

Illustrative examples of the present disclosure include, without limitation, a window shade handle system that includes a handle section and a post configured on a first end of the handle section. The post may have four sides and may be configured in a track section comprising a post channel that restrains the post on the four sides.

Illustrative examples of the present disclosure further include, without limitation, a window shade handle system that includes a front handle section affixed to a rear handle section, where the front handle section and the rear handle section form a channel that accommodates a window shade wrapped about a rod. The channel may include a raised portion that physically contacts the window shade and a remaining portion that permits expansion and contraction of the window shade.

Other features of the inventive systems and methods are described below. Disclosed features, functions, and advantages may be achieved independently in various examples or may be combined in yet other examples, further details of which can be seen with reference to the following description and drawings.

BRIEF DESCRIPTION OF DRAWINGS

Examples of techniques and apparatuses in accordance with the present disclosure are described in detail below with reference to the following illustrations:

FIG. 1A depicts a non-limiting example window shade handle;

FIG. 1B depicts another non-limiting example window shade handle;

FIG. 5 depicts a non-limiting example window shade handle and tracks;

FIG. 6 depicts a non-limiting example window shade handle and track;

FIG. 7 depicts a non-limiting example window shade and shade handle;

FIG. 8 depicts a non-limiting example window shade handle;

FIG. 9 depicts a non-limiting example window shade handle and rod; and

FIG. 10 depicts a non-limiting example window shade, shade handle, and tracks.

DESCRIPTION

Figure 2:
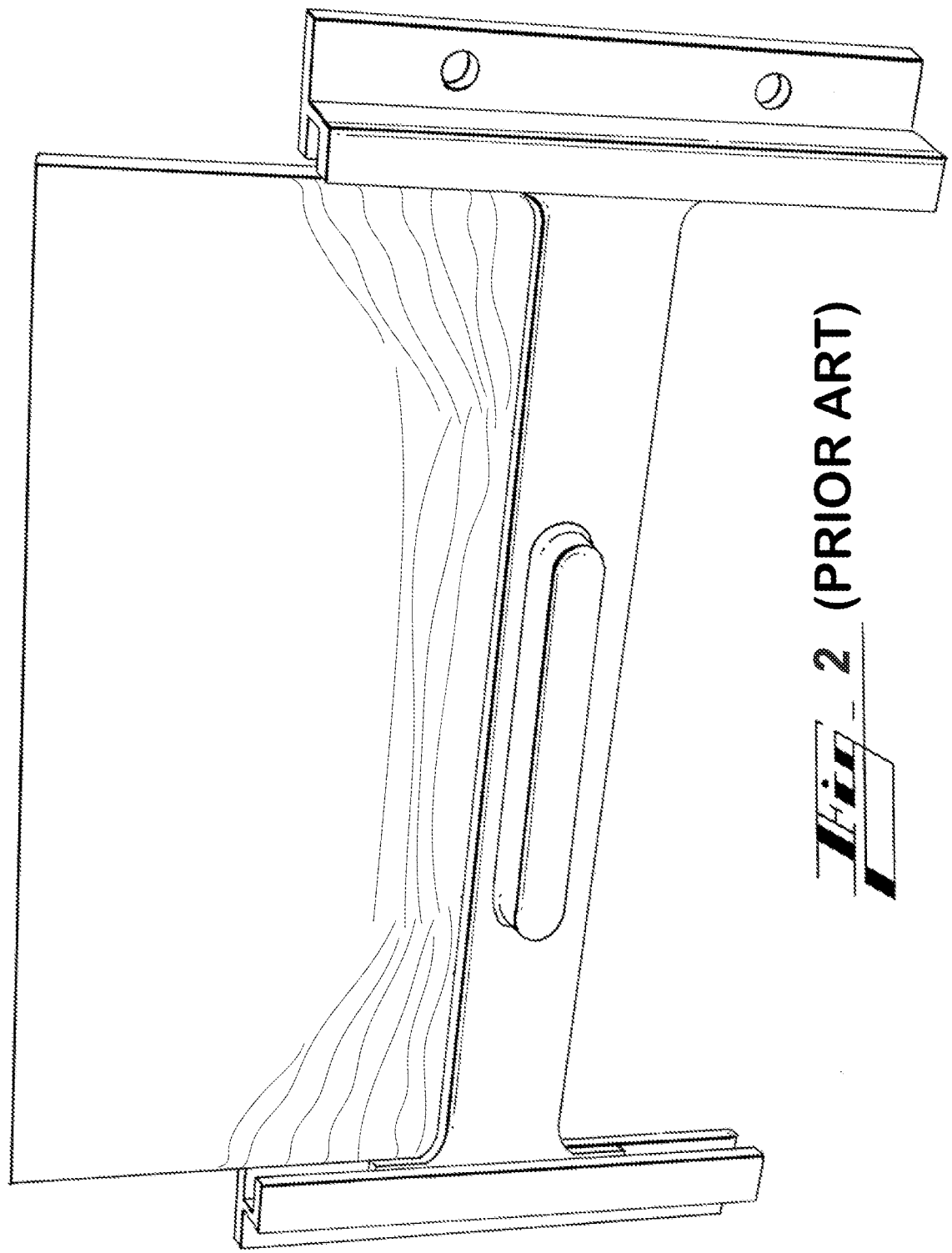
FIG. 2 depicts a non-limiting example window shade system.
Figure 3:
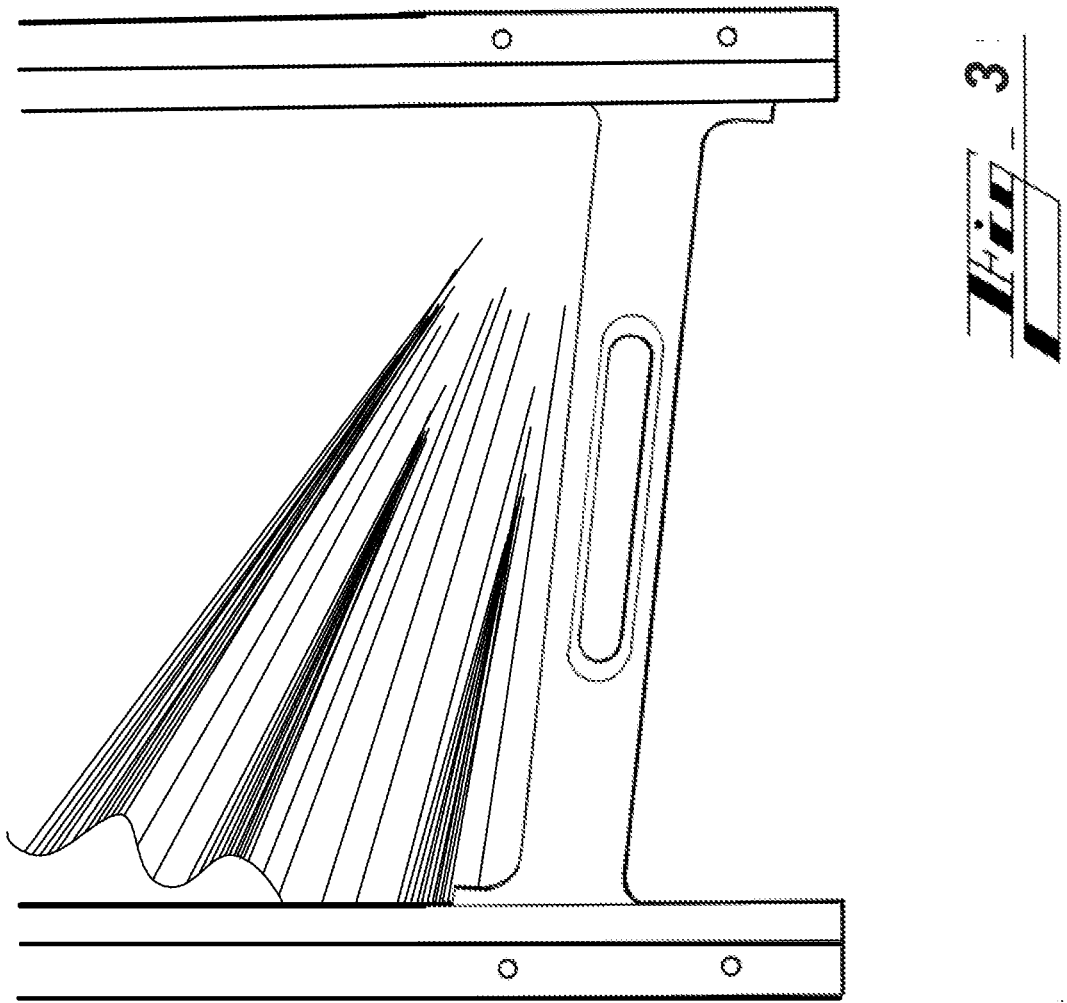
FIG. 3 depicts another non-limiting example window shade system.
Figure 4:
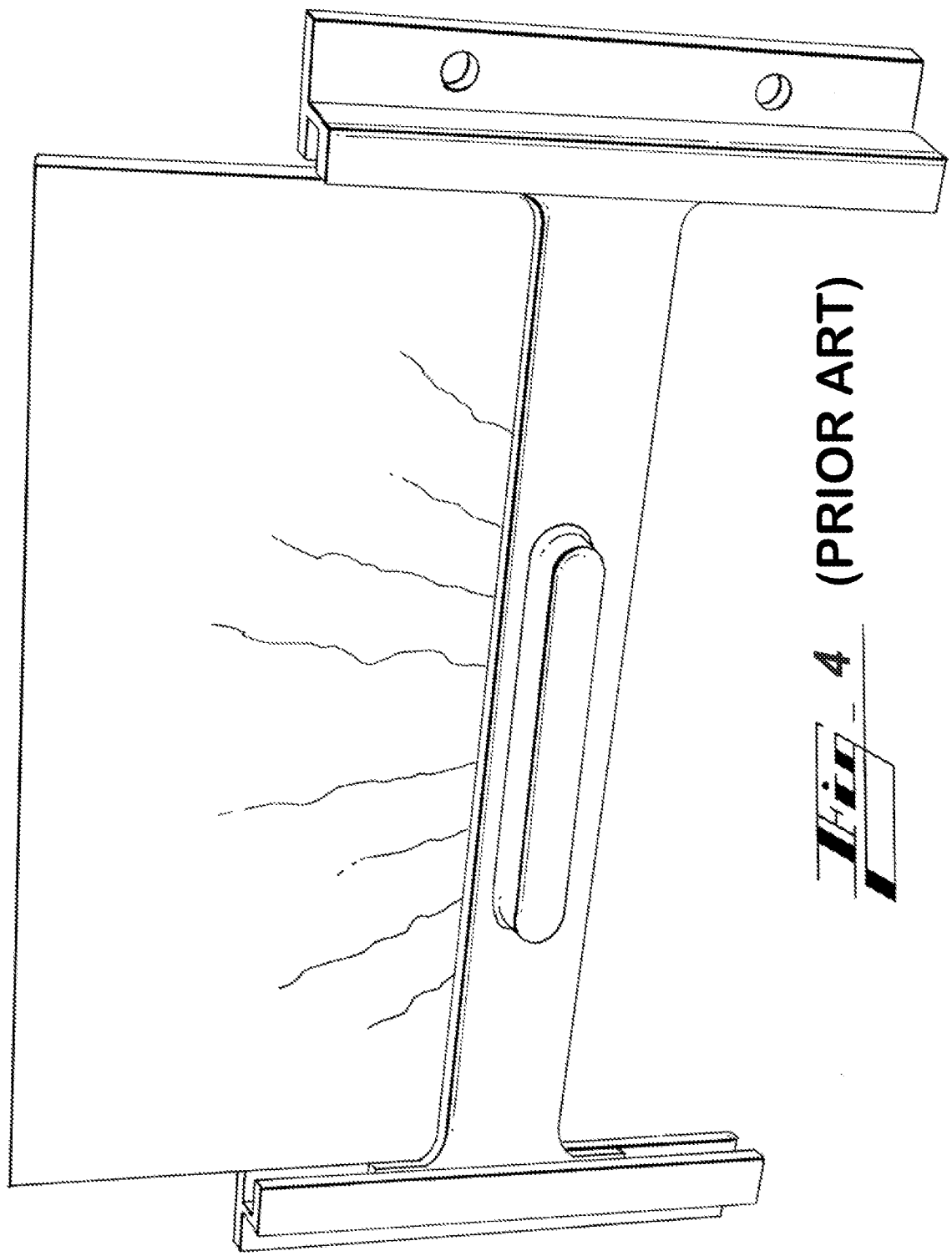
FIG. 4 depicts another non-limiting example window shade system.

FIG. 5 illustrates handle 500 that may be used in an example of the instant disclosure. Handle 500, and all other examples set forth herein, may be used with solid shades, with roller shades, and with any other window shade systems. Handle 500 may include handgrip 501 that may be used by a passenger to grip and move handle 500. Handgrip 501 may be an integral part of handle 500 or may be a separate piece affixed using any means. Handle 500 may be configured with posts 502 and 503 that travel within tracks 511 and 512, respectively. Each of posts 502 and 503 may have a substantially rectangular or substantially square cross-sectional geometry. Each of tracks 511 and 512 may provide four sides of restraint about each of posts 502 and 503, respectively, ensuring that posts 502 and 503 keep handle 500 in alignment, maintaining handle 500 at an orientation perpendicular to tracks 511 and 512, and preventing handle 500 from rotating.

As shown in track 511, post channel sides 511a, 511b, 511c, and 511d form a channel in which post 502 may be travel. These post channel sides provide substantially equal restraint to all four sides of post 502. Side 511d of track 511 includes an opening allowing handle 500 to protrude from track 511. The interior of the post channels may be constructed with a smooth surface allowing for ease of movement of posts 502 and 503 within such post channels. Because of the arrangement of posts 502 and 503 within the post channels of tracks 511 and 512, respectively, handle 500 may be self-aligning. Therefore, twisting of handle 500 may be reduced or eliminated. Handle 500, because it remains perpendicular to tracks 511 and 512, is free to slide without significant variation of the friction provided by each of tracks 511 and 512.

Because the surfaces of the four sides of the post channels of tracks 511 and 512 may closely enclose posts 502 and 503, the post channels may exert equal contact pressure on each side of post 502 and 503, reducing contact friction between each post and its respective track. This also reduces rubbing or scraping damage from uneven friction between shade posts and shade tracks that could create debris that may accumulate in the tracks. The disclosed examples provide for reduced wear in a window shade system and thereby increase the window shade system's lifespan, resulting in reduced maintenance costs for the operator of the aircraft.

Handle 500 may include pads 521 that provide light friction against tracks 511 and 512 (note that pads similar to pads 521 may be configured proximate to post 503, but would be obscured by track 512 in FIG. 5) allowing the shade to remain stationary in any position, thus permitting a passenger to have the shade partially or entirely raised without performing additional steps to affix the shade in position. Next to the channel formed by post channel sides 511a-d may be a pad channel with pad channel sides 511e and 511f that form a pad channel in which pads 521 may travel and provide friction for maintaining handle 500 in position. Pads 521 may be pads affixed to handle 500 or may be integral to handle 500. Tracks 511 and 512 may be configured with any means for affixing such tracks within a window frame, such as hole 513.

FIG. 6 illustrates one end of example handle 600 in a larger view, assembled within track 612. As can be seen in this figure, track 612 provides a post channel created by post channel sides 612a-d in which post 603 of handle 600 may be configured and may slide up and down, allowing a shade affixed to handle 600 to be raised and lowered. The four sides of restraint provided by post channel sides 612a-d assist in maintaining a perpendicular orientation of handle 600 relative to track 612, thereby inhibiting twisting of handle 600. Handle 600 may include handgrip 601 that may be used by a passenger to grip and motivate handle 600. Handgrip 601 may be an integral part of handle 600 or may be a separate piece affixed to handle 600 using any means.

Track 612 may include a pad channel created by pad channel sides 612e. A counterpart pad channel and pad at the opposite side of handle 600 from pad 621 and pad channel 612e may be present, but is obscured in FIG. 6 by handle 600. Handle 600 may be configured with pads 621 that may be configured within this pad channel. Pads 621 may provide friction against pad channel sides such as 612e (see also 511e and 511f of FIG. 5). This friction may hold a shade affixed to handle 600 in the position in which a passenger has left it after moving it up or down. Track 612 may be configured with any means for affixing such a track within a window frame, such as hole 613.

A handle may be constructed of two separate sections. FIG. 7 illustrates example handle 700 having front handle section 704 and rear handle section 705. In this example, front handle section 704 may have an integral handgrip 701. Shade 710 may be configured about rod 715 between front handle section 704 and rear handle section 705. Rod 715, with shade 710 wrapped about rod 715, may be configured in a channel formed by front handle section 704 and rear handle section 705. Note that in many examples, front handle section 704 and rear handle section 705 may be constructed such that there is spacing or a gap about shade 710 allowing shade 710 to expand and contract within handle 700. For example, gap 721 may be present when front handle section 704 and rear handle section 705 are placed together. Gap 721 may extend throughout the shade cavity and about rod 715 and shade 710, allowing shade 710 to expand and contract throughout handle 700. Where front handle section 704 and rear handle section 705 meet below the channel accommodating rod 715 with shade 710 at interface 722, there may be no gap, allowing secure connection of front handle section 704 and rear handle section 705 to each other. Shade 710 may wrap around rod 715 between handle sections 704 and 705, which may retain the shade and rod when the shade is moved by a user pulling on the handle formed by handle sections 705 and 705.

FIG. 8 illustrates a front view of example rear handle section 805 that may be similar to rear handle section 705 of FIG. 7. Rod channel 806 may be provided by rear handle section 805 to accommodate a rod about which a shade may be wrapped. Rod channel 806 of rear handle section 805 may form a channel with a counterpart front handle section that restrains a rod and a shade without requiring additional restraints, thus reducing the number of parts and components required to construct a handle and shade as described herein. As with the rod channel discussed in regard to FIG. 7, rod channel 806 may allow for some space or a gap about a shade and a rod that may be configured therein. However, in some examples, rod channel 806 may be constructed with raised section 807 that restrains a rod and shade therein. Raised section 807 may be located substantially in the center of rod channel 806, providing a contact point to secure a rod and shade configured in a handle using rear handle section 805. A similar raised section may be constructed in a rod channel of a front handle section of a handle, such as front handle section 704 of FIG. 7. These contact points may provide a physical restraint of the shade, allowing the shade to expand and contract everywhere else within the handle in which the shade is configured. For example, the left half of a shade may expand and contract within the left half of a handle using rear handle section 805, while the right half of the shade may expand and contract within the right half of rear handle section 805 independently, with the shade remaining centered within the handle due to the restraint provided by raised section 807.

Rear handle section 805 may include posts 802 and 803 that may be posts as described herein. In one example of a rear handle section, the rear handle section may have posts while a front handle section may not. Alternatively, a front handle section may have posts while a rear handle section may not. In yet another alternative example of a rear handle section, a front and rear section of a handle may each be constructed with portions of posts, and when assembled, may form a complete post at each end of the assembled handle. All such examples are contemplated as within the scope of the present disclosure. Rear handle section 805 may include holes 808 that may be used to attach rear handle section 805 to a front handle section.

FIG. 9 illustrates further example rear handle section 905 that may be constructed with post 902 that may be similar to posts as described herein. Rear handle section 905 may also include rod channel 906 and raised section 907 that may be similar to rod channel 806 and raised section 807 of FIG. 8. As shown in FIG. 9, rod channel 906 may accept rod 915 with a shade (not shown) wrapped about rod 915. Raised section 907 may grip or otherwise apply friction or restraint to rod 915 and a shade wrapped about rod 915, allowing such a shade to otherwise expand and contract within rod channel 906 and within a handle formed using rear handle section 905 and a front handle section. The shade wrapped about rod 915 may be constrained at a center portion of such a shade by raised section 907 (see also section 807 of FIG. 8) to help such a shade remain stationary horizontally, i.e., not move to either the left or the right side of the window while otherwise being moved up or down or being affected by environmental conditions. Rod 915 may provide added rigidity to a handle constructed with rear handle section 905 and a front handle section.

Rear handle section 905 may include one or more holes 908 (only one shown) that may be used to affix rear handle section 905 to a front handle section. To ensure that a gap remains about a shade configured in a handle constructed with rear handle section 905, rear handle section may include 905 raised portion 909 configured about hole 908. This raised portion may contact a front handle section through holes in a shade, ensuring that rear handle section 905 may be firmly affixed to the front handle section while maintaining space about a shade so that the shade may expand and contract. Thus, a handle may be formed with two handle sections secured to one another and restraining a shade without having the entire width of the shade compressed between the two handle sections, thereby allowing expansion and contraction of the shade, increasing the durability and lifespan of the shade and helping to maintain the shade's wrinkleless appearance.

FIG. 10 illustrates example rear handle section 1005 with shade 1010 wrapped about rod 1015 (not directly visible, but within wrapped shade 1010). Tracks 1011 and 1012 are shown, providing post channels about each of posts 1002 and 1003. As shown in this figure, shade 1010 may be constructed with holes 1018 that line up with holes 1008 of rear handle section 1005, allowing rear handle section 1005 to be affixed to a front handle section. Note that holes 1018 may be larger than holes 1008, allowing room for any raised portion about holes 1008 to protrude through holes 1018 and make contact with a front handle section, and allowing shade 1010 to expand and contract about holes 1008 and any means or devices that may be protruding through holes 1008 to affix rear handle section 1005 to a front handle section. For example, in some implementations, fastening screws may be used to affix a front handle section to a rear handle section. Such screws may protrude through holes in the handle sections and the shade, such as holes 1008 and 1018. Holes 1018 may also be large enough to allow for tolerances within the mating parts used to secure two handle sections together.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. The example systems and components described herein may be configured differently than described. For example, elements may be added to, removed from, or rearranged compared to the disclosed examples. While certain illustrative examples have been described, these are examples only, and are not intended to limit the scope of the inventions disclosed herein. Indeed, the novel methods and systems described herein may be implemented in a variety of other forms. The accompanying claims and their equivalents are intended to cover such forms or modifications as would fall within the scope and spirit of certain of the inventions disclosed herein.

The invention claimed is:

1. A handle system for an airplane window shade comprising:
   a handle;
   a post configured on a first lateral end of the handle, the post comprising four sides forming a rectangular;
   a track section comprising a post channel having a rectangular cross section configured about the post, wherein the post channel restrains the post on the four sides; and
   a pad affixed to the handle, wherein the track section further comprises a pad channel that provides friction against the pad to allow the handle to remain stationary relative to the track section.

2. The window shade handle system of claim 1, wherein the handle comprises a front handle section and a rear handle section.

3. The window shade handle system of claim 2, wherein the rear handle section comprises at least one hole.

4. The window shade handle system of claim 3, wherein the rear handle section comprises a raised portion about the at least one hole.

5. The window shade handle system of claim 1, further comprising a window shade.

6. The window shade handle system of claim 5, further comprising a rod, wherein the window shade is configured about the rod.

7. The window shade handle system of claim 6, wherein the rod is configured within a channel formed by a front handle section of the handle and a rear handle section of the handle.

8. The window shade handle system of claim 7, wherein the front handle section comprises a handgrip.

9. An airplane window shade handle system comprising:
   a front handle section affixed to a rear handle section,
      wherein the front handle section and the rear handle section form a first channel that accommodates a window shade configured about a rod,
      wherein the first channel comprises:
         a raised portion that contacts the window shade configured about the rod and applies pressure to the window shade and rod with the window shade remaining centered within the first channel due to the pressure provided by raised portion, and a remaining portion that permits movement of the window shade within the remaining portion; and wherein the front handle section and the rear handle section form a second channel that accommodates the window shade, wherein the second channel includes a gap about the window shade allowing the window shade to expand and contract within the gap.

10. The window shade handle system of claim 9, wherein the front handle section comprises a handgrip.

11. The window shade handle system of claim 9, further comprising a pad affixed to at least one of the front handle section or the rear handle section.

12. The window shade handle system of claim 11, further comprising a track comprising a pad channel that provides friction against the pad.

13. The window shade handle system of claim 9, wherein the rear handle section comprises a first post configured on a first lateral end of the rear handle section and a second post configured on a second lateral end of the rear handle section.

14. The window shade handle system of claim 13, further comprising:

a first track comprising a first post channel that restrains the first post on four sides of the first post; and a second track comprising a second post channel that restrains the second post on four sides of the second post.

15. The window shade handle system of claim 9, wherein the rear handle section comprises at least one hole.

16. The window shade handle system of claim 15, wherein the rear handle section is affixed to the front handle section with at least one screw protruding through the at least one hole.

17. The window shade handle system of claim 15, wherein the rear handle section comprises a raised portion configured about the at least one hole.

18. The window shade handle system of claim 17, wherein the window shade comprises a hole configured to accommodate the raised portion.

* * * * *